United States Patent [19]

Mizuhara

[11] Patent Number: 5,043,229
[45] Date of Patent: Aug. 27, 1991

[54] BRAZED CERAMIC-METAL COMPOSITE

[75] Inventor: Howard Mizuhara, Hillsborough, Calif.

[73] Assignee: GTE Products Corporation, Stamford, Conn.

[21] Appl. No.: 537,659

[22] Filed: Jun. 14, 1990

[51] Int. Cl.$^5$ .................... B32B 15/04; B23K 31/02
[52] U.S. Cl. .................... 428/613; 428/614; 428/632; 428/665; 428/671; 428/469; 228/124; 228/263.12
[58] Field of Search .............. 428/613, 614, 627, 632, 428/660, 662, 665, 671, 680, 469; 228/121, 122, 124, 189, 263.12

[56] References Cited

U.S. PATENT DOCUMENTS

| | | | |
|---|---|---|---|
| 4,529,836 | 7/1985 | Powers et al. | 228/123 |
| 4,883,217 | 11/1989 | Dunn et al. | 228/122 |
| 4,883,218 | 11/1989 | Dunn et al. | 228/122 |
| 4,924,033 | 5/1990 | Iyogi et al. | 228/122 |

*Primary Examiner*—R. Dean
*Assistant Examiner*—George Wyszomierski
*Attorney, Agent, or Firm*—James Theodosopoulos

[57] ABSTRACT

A composite consists of a ceramic brazed to another ceramic by means of a joint layer therebetween. The joint layer comprises a porous metal interlayer and an active brazing filler metal penetrating through the porous metal interlayer.

6 Claims, No Drawings

BRAZED CERAMIC-METAL COMPOSITE

This invention concerns brazed ceramic-metal composites. A purpose of this invention is to provide a composite that has improved resistance to brittleness fracture over the ceramic alone.

This invention discloses a composite in which a ceramic is brazed to a ceramic or to a metal using an active brazing filler metal. Disposed in the braze joint is a porous metal interlayer which is not a solid layer, that is to say, the metal interlayer can be sieve-like, perforated, spaced apart ribbons or wires, mesh or the like. Thus, the filler metal can penetrate through the interlayer upon melting of the filler metal during the brazing operation. Also, the metal interlayer does not melt during the brazing operation. After the brazing operation the joint layer of metal interlayer and filler metal remains ductile enough during cool down to creep and finish at room temperature with low joint stress. The metal interlayer should not substantially alloy with the filler metal during brazing because such alloying would reduce the ductility needed for creeping during cool down. The braze joint should also be thick enough for creeping during cool down. The braze joint shown, for example, in U.S. Pat. No. 4,623,513, which does not have a porous metal interlayer, would not be thick enough.

A preferred metal interlayer is tungsten or molybdenum mesh. The thermal expansion coefficient of the joint layer of mesh and filler metal can be controlled by controlling the volumetric ratio of filler metal to mesh.

Preferably, also, the active metal in the active brazing filler metal is titanium.

EXAMPLE 1

Alumina ceramics were joined using tungsten wires as the metal interlayer and a filler metal consisting of, in weight percent, 93 Cu, 3 Si, 2 Ti, 2 Al. A single layer of 0.254 mm diameter tungsten wires was laid on a 5 mm thick by 50 mm square alumina substrate and a 3 mil thick filler metal foil, 50 mm square, was placed over the tungsten wires. Another alumina substrate was placed over the foil and another layer of tungsten wires, oriented 90° to the first layer, was placed on the alumina substrate, followed by filler metal foil and finally a third alumina substrate. The assembly was brazed at 1050° C. under $10^{-5}$ torr vacuum. The brazed assembly was intact. In this example the volume ratio of filler metal to tungsten was 30 to 70. The thermal coefficients of expansion of tungsten and filler metal are, respectively, 4.45 and $16.5 \times 10^{-6}$/°C. Thus, the coefficient of the joint layer of tungsten and filler metal was about $8 \times 10^{-6}$/°C., a close match to the thermal coefficient of alumina which is $8 \times 10^{-6}$/°C.

EXAMPLE 2

In this example, molybdenum mesh was brazed between two alumina plates using a brazing filler metal consisting of, in weight percent, 63 Ag, 1.75 Ti, 35.25 Cu. The molybdenum mesh was of a simple cross weave construction measuring 7.2 cm long by 5.3 cm wide by 0.06858 cm thick and weighing 4.7 grams. The alumina plates each measured 7.2 cm by 5.3 cm by 0.6 cm thick. The bulk volume of the mesh was 2.621 cc ($5.3 \times 7.2 \times 0.06868$). The volume of the molybdenum itself was 0.461 cc, obtained by dividing 4.7 grams by 10.2 g/cc, the density of molydenum. Therefore, the volume of the void in the mesh was 2.16 cc. This void was filled with brazing filler metal. The volume ratio of filler metal to molybdenum was 82.4 to 17.6. Thus, the thermal expansion coefficient of the interlayer of molybdenum mesh and filler metal was about $16 \times 10^{-6}$/°C., which is higher than the coefficient of $8 \times 10^{-6}$/°C. for alumina. However, the thickness and ductility of the interlayer were sufficient to cause creep during cooling, thereby minimizing residual stress between the metal and the alumina. The assembly, consisting of an alumina plate, a 22 mil thick foil of the filler metal, the molybdenum mesh and another alumina plate, was placed in a vacuum furnace and heated to 840° C. under $10^{-5}$ torr vacuum. An excellent sound assembly was produced.

EXAMPLE 3

A stacked assembly was prepared of eight layers of silicon nitride plates and seven layers of brazing filler metal foil, one layer of brazing filler metal foil between each pair of silicon nitride plates. Each silicon nitride plate measured 1¼" by 1¼" by 65 mils thick. Each brazing filler metal foil measured 1¼" by 1¼" by 4 mils thick and had a composition of, in weight percent, 59 Ag, 1.25 Ti, 12.5 In, 27.25 Cu. A filler metal gap was maintained by placing nickel wires on each filler metal foil. Four strands of 3.5 mil nickel wire by 1" long were placed, parallel to each other and equally spaced, on each filler metal foil. The solubility of nickel in the brazing filler metal is nil. Thus the nickel wires act as a thickness controller to prevent the molten brazing metal from being squeezed out, thereby maintaining a metal interlayer-filler metal thickness of at least 3.5 mils. The stacked assembly was placed in a vacuum furnace with a 400 gram load on the stacked assembly and was brazed at 750° C. under $10^{-5}$ torr vacuum. The assembly showed no lamination type fracture after brazing.

EXAMPLE 4

A 4.1" diameter by 90 mil thick alumina disc was brazed to a 4.1" diameter by 750 mil thick steel disc (type 1018) with 22 mil thick molybdenum mesh therebetween. A 13 mil thick Cusil ABA preform 4.1" diameter was placed on each side of the molybdenum mesh. Cusil ABA is made by Wesgo Division, GTE Products Corporation, and has a composition of, in weight percent, 63 Ag, 1.75 Ti, 35.25 Cu. The assembly was placed in a vacuum furnace with a 200 gram load and was brazed at 840° C. under $10^{-5}$ torr vacuum, followed by a slow furnace cool. The assembly was intact after cooling.

I claim:

1. A composite consisting of an alumina brazed to alumina by means of a joint layer therebetween, the joint layer comprising a porous metal interlayer and an active brazing filler metal penetrating through the porous metal interlayer, said composite having been brazed at a temperature lower than the melting point of the porous metal interlayer so that melting of the porous metal interlayer does not occur during brazing, the porous metal interlayer not substantially alloying with the active brazing filler metal during brazing, the porous metal interlayer being tungsten.

2. The composite of claim 1 wherein the active brazing filler metal is a Cu-Si-Ti-Al alloy having a coefficient of expansion of $16.5 \times 10^{-6}$/°C. and wherein the volume ratio of filler metal to tungsten in the joint layer of filler metal and tungsten is about 30 to 70 so that the coefficient of expansion of said joint layer is about $8 \times 10^{-6}/°C$.

3. A composite consisting of a ceramic brazed to a ceramic by means of a joint layer therebetween, the joint layer comprising a porous metal interlayer and an active brazing filler metal penetrating through the porous metal interlayer, said composite having been brazed at a temperature lower than the melting point of the porous metal interlayer so that melting of the porous metal interlayer does not occur during brazing, the porous metal interlayer not substantially alloying with the active brazing filler metal during brazing, the coefficient of expansion of the metal comprising the porous metal interlayer being lower than the coefficient of expansion of the ceramics, the coefficient of expansion of the brazing filler metal being higher than the coefficient of expansion of the ceramics, the volume ratio of the porous interlayer metal and the brazing filler metal being such that the coefficient of expansion of the joint layer approximates the coefficient of expansion of the ceramics.

4. The composite of claim 3 where the ceramics are the same.

5. The composite of claim 3 where the porous interlayer metal is tungsten.

6. The composite of claim 3 where the ceramics are alumina.

* * * * *